June 4, 1963    G. KIPER    3,092,003
RETARDING DEVICE FOR PHOTOGRAPHIC SHUTTER
Filed March 30, 1961    2 Sheets-Sheet 1

INVENTOR.
GERD KIPER
BY Connolly and Hutz
ATTORNEYS

United States Patent Office 3,092,003
Patented June 4, 1963

3,092,003
RETARDING DEVICE FOR PHOTOGRAPHIC
SHUTTER
Gerd Kiper, Unterhaching, near Munich, Germany, assignor to Agfa Aktiengesellschaft, Leverkusen-Bayerwerk, Germany, a corporation of Germany
Filed Mar. 30, 1961, Ser. No. 99,583
Claims priority, application Germany Apr. 14, 1960
26 Claims. (Cl. 95—63)

This invention relates to a device for retarding the release of a photographic shutter through application of the inertia of a retarding mass, and it more particularly relates to such a retarding device which applies this retarding inertia to the shutter through a retarding lever.

There are known devices for controlling the operating speed or movement of photographic shutters by the engagement with them of the inertia of retarding masses. These devices generally operate by imposing the inertia of their retarding mass upon the element which drives the shutter sectors in their opening or closing movement, preferably while the shutter sectors are opened. The magnitude of the retarding effect depends upon the weight of the retarding mass, the mass of the shutter parts and the driving power applied to the shutter driving element. The strength of the shutter retarding force also depends upon the extent to which the retarding member is interposed into the path of movement of the driving element, with the extent of this interposition being controlled by suitable devices such as timing cam surfaces.

Conventional shutter operating speed controlling devices of this type are made in the form of rotating disc retarding masses which may include several discs which are interconnected by gear trains. When the primary retarding element, which is usually a rotatable disc, is engaged with the driving element through a compound gear transmission, its retarding effect upon the driving element is accordingly multiplied. However, retarding devices of this type have the disadvantage of always exerting the same inertia mass upon the retarded element. This application of an unvariable mass together with the geometric variation in retarding speeds required for photographic shutters results in a very high sensitivity in the setting for short or fast shutter speeds, which can only be retarded very slightly. This makes it necessary to adjust the retarding or shutter speed control mechanism to make it possible to provide the shortest and slightest retarded shutter speeds; but when this is done, the longer or slower shutter speeds cannot be adequately provided in their required range of adjustment. Another disadvantage of shutter retarding devices of the aforementioned type is that the compound gear trains and bearings must be made very carefully and accurately to insure their proper functioning which makes them expensive. Furthermore, these compound gear trains, which are rather delicate, are very susceptible to soiling and gumming.

It has also been proposed that such compound gear retarding devices incorporates a shifting means for varying their transmission ratio to permit their effective inertia to be changed in accordance with the geometric variation in shutter speeds. However, such retarding devices occupy considerable space and are quite expensive to manufacture.

An object of this invention is to provide a simple and economical retarding device in which the effective retarding inertia mass may be varied;

Another object is to provide such a retarding device in which the initial retarding inertia may be set high for slower shutter speeds and decreased for shorter shutter speeds; and A further object is to provide such a retarding device in which a wide range of adjustment is provided for slower shutter speeds.

In accordance with this invention a shutter retarding device includes a retarding lever engaged with a rotatably mounted retarding mass through mutually contacting surfaces whose moment arms vary during their contacting movement. This causes the retarding forces transmitted through the lever to vary during the operation of the shutter. It is advantageous to increase the moment arm relative to the retarding mass during the release of the shutter to cause the retarding effect to decrease as the shutter operates. It is further advantageous to provide the highest effective transmission of force from the retarding mass to the shutter for longer or slower shutter speeds while the effective transmission of force is decreased for the shorter or faster shutter speeds. This is advantageously accomplished by shifting the initial point of contact of the retarding lever with the retarding mass closer to its axis of rotation for longer speeds and further from it for shorter shutter speeds. This also provides a wider range of adjustment for the longer shutter speeds. Because of the variation in retarding force that this invention permits, it can provide a wide range of shutter speeds which vary in a geometric relationship by adjustment of a timing cam which varies in substantial accordance with a linear function.

The retarding mass of this invention is advantageously made in the form of a rotating disc. This disc includes a surface which is contacted by a retarding lever which is interposed in the path of movement of a moving element of the shutter. The exposure time of the shutter being a function of the speed of movement of this moving element. The contacted surface of the retarding mass is interposed in the path of movement of the retarding lever, and it is preferably disposed radially with respect to the axis of rotation of the retarding mass. The retarding lever is accordingly suitably made in the form of a lever having two arms, one of which is driven by the moving element of the shutter and the other of which is retarded by its pressurable contact with a surface of the retarding mass.

In accordance with another aspect of this invention the respective moment arms relative to lever and mass, which control the effective retarding force transmitted from the retarding mass through the lever are adjustable by varying the distance between the axes of rotation of retarding lever and retarding mass. Furthermore, additional retarding masses can be connected in series with the primary mass and with each other by similar variable moment arm transmissions. These additional retarding stages have their engagement controlled by auxiliary timing control cams which can even totally disengage them from the primary retarding mass.

This invention provides the advantage of forming and arranging the retarding lever and retarding mass to engage with each other in a manner which provides a relatively high transmission of retarding force from the retarding mass to the lever for longer or slower shutter speeds such as a speed of $\frac{1}{30}$ of a second. During the operation of the retarding device, the moment arm relative to the retarding mass continuously increases sometimes decreasing the retarding effect practically down to nothing. This invention can also adjust the initial effective force transmission from the retarding mass to lever, such as by setting the moment arm relative to the retarding mass at a relatively higher distance. This is easily accomplished by varying the distance between the axes of rotation of the retarding lever and mass to permit a very low initial retarding effective force provided by a relatively longer moment arm to be utilized for shorter or faster shutter speeds, for example in the range of $\frac{1}{250}$ second. This permits the effective retarding force of the retarding mass to be initially small for faster speeds in comparison to the forces utilized for slower speeds. Such minimal retarding forces are facilitated by utilizing a weak return spring for the retarding mass. The variation in initial effective force transmission in addition to the variation which occurs during the release of the shutter permit shutter speeds which vary in accordance with a function of a higher power such as a geometric power to be provided by a control device such as a timing cam whose form varies in accordance with a much lower power function such as a linear function thereby facilitating its manufacture and operation.

In a preferred embodiment of this invention the retarding lever and retarding mass are respectively formed as point and planar contacting surfaces which greatly simplifies their manufacture and assembly.

Another characteristic of this invention permits the initial effective force transmission between the retarding lever and the retarding mass to be varied considerably. This allows a slight initial effective transmission to be provided for shorter shutter speeds by only a slight variation in center distances between the lever and mass. During the release of these shorter speeds, the retarding effect is also minimized by the interposition of the retarding lever only slightly into the path of movement of the shutter. This makes it possible for the slower speeds, which are provided by a greater interposition of the retarding lever into the path of the shutter, to be only insignificantly affected by provision of only a slight initial retarding force for the faster shutter speeds. The facility of adjustment for longer shutter speeds can also be facilitated by varying the angle of engagement of the retarding lever with the timing cam thereby permitting adjustment of the retarding effect to be accomplished at two points between the timing cam and the retarding lever.

Further in accordance with this invention the spring which urges the retarding lever into engagement with the timing cam can be made very slight to minimize its effect upon shorter shutter speeds. This is also true with respect to the spring which urges the retarding mass into engagement with the retarding lever.

Novel features and advantages of the present invention will become apparent to one skilled in the art from a reading of the following description in conjunction with the accompanying drawings wherein similar reference characters refer to similar parts and in which.

Figure 1:
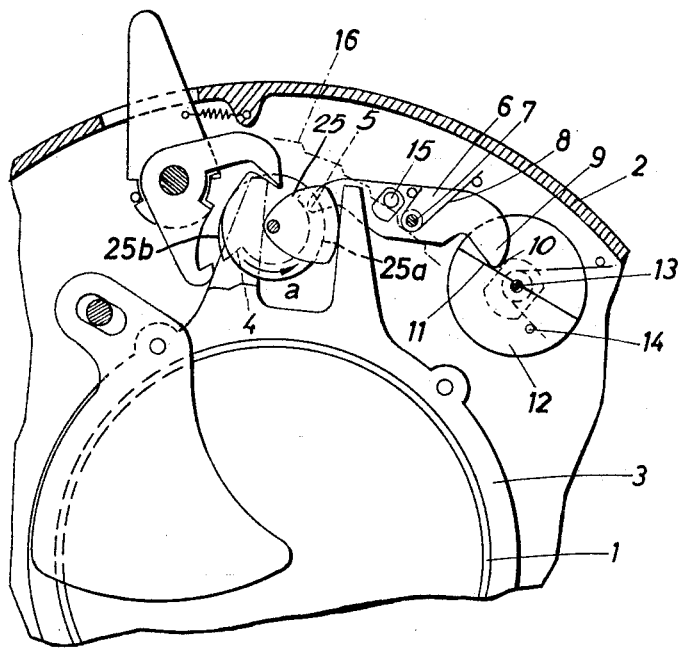
FIG. 1 is a schematic diagram of one embodiment of this invention incorporating a single stage retarding mass.

In FIG. 1 is shown a shutter incorporating a sector ring 3 which is concentrically arranged to rotate about the optical axis encompassed within lens tube 1 which is attached to shutter casing 2. The shutter described in FIG. 1 is, for example, of the type described in detail in commonly assigned copending patent application S.N. 810,643, filed May 4, 1959. Sector ring 3 is engaged by shutter driving cam 25 which is driven by a wound spring (not shown). Cam 25 incorporates a driving lobe 25a and a retarding lobe 25b. Driven lobe 25b engages the driven end or arm 5 of retarding lever 6 which is rotatably mounted about a stationary pivot pin 7. A spring 8 which is for example a torsion spring reacts between shuter casing 2 and retarding lever 6 in a direction to interpose its driven end or arm 5 into the path of movement of engaging surface 4 of shutter cam lobe 25b. The exposure time provided by the shutter is for example a function of the speed of movement of moving element 25 whose driving lobe 25a engages a forked projection of sector ring 3. The other or retarded arm 9 of retarding lever 6 is made in the form of a projection 9 having a rounded tip 10 which engages a contacting surface 11 formed upon retarding mass 12. Contacting surface 11 is, for example, formed as planar surface which is radially arranged with respect to the axis of rotation of retarding mass 12. Mass 12 rotates about a bearing pin 13, and a spring 14 reacts between shutter casing 2 and retarding mass 12 in a direction to maintain surface 11 engaged with retarded arm 9 of retarding lever 6. Bearing pin 13 is eccentrically mounted with respect to shutter casing 2 to permit the distance between the axes of rotation of lever 6 and retarding mass 12 be varied for reasons later described in detail. A control pin 15 extends from the driven arm 5 of retarding lever 6, and this control pin 15 is also eccentrically connected with retarding lever 6 to permit its relative position with respect to lever 6 to be varied. This eccentric connection can be made in the form of fairly tight riveting which can also incorporate a holding spring to permit the position to which pin 15 is set to be maintained when set. Control pin 15 is engaged by the action of torsion spring 8 which reacts to urge lever 6 into engagement with the control surface provided by a timing cam 16 which is graded or stepped in increments providing various exposure times which are not specifically indicated.

When shutter driving element 25 rotates in the direction of arrow "a" it moves its arresting surface 4 toward the driven arm 5 of retarding lever 6; and upon engagement therewith, it rotates retarding lever 6 against the force of return spring 8 until arresting surface 4 becomes disengaged from driven arm 5. This in turn rotates retarding mass 12 through the action of retarding arm 9 of retarding lever 6 which contacts surface 11 of retarding mass 12 to rotate it against the force of its inertia and that of return spring 14 reacting upon it.

The effective retarding force exerted upon shutter driving element 25 and consequently upon the shutter is determined by the extent to which retarding arm 5 of retarding lever 6 is interposed into the path of the arresting surface 4 of the retarding cam lobe 25b. This extent is controlled by the adjustment of timing cam 15.

When retarding arm 5 of retarding lever 6 is adjusted to be deeply interposed into the path of movement of arresting surface 4 of cam lobe 25b, a relatively large duration of retardation is transmitted to the driving element. The duration of exertion of the retarding forces upon the shutter is less when the retarding lever 6 is adjusted by timing cam 16 to enter more shallowly into the path of movement of shutter driving element 25b, which correspondingly lessens the effective force exerted by retarding mass 12 upon the shutter. Longer retarded slower shutter speeds can therefore be provided by shifting the position of eccentric projection 15, which controls the duration of the effective retarding force applied to the shutter from mass 12; and the shorter or faster speeds of the shutter can be provided by shifting the position of bearing pin 13. The latter is true because the shifting of the position of bearing pin 13 varies the initial force applied through the transmission to the shutter by varying the moment arm of the application of arm 9 lever 6 to mass 12 relative to the axis of rotation of mass 12. The initial moment arm accordingly greatly affects shorter shutter speeds because the duration of the retarding effect is much shorter for them, which makes the initial transmission ratio extremely important in determining the amount of the retardation which they impart.

During the release of the shutter for slower shutter speeds, the operating movement of the shutter is much greater. The duration of exertion of the retarding effect is, therefore, then more significant which allows the degree of interposition of the retarding lever into the path of the moving element of the shutter to the most instrumental in regulating the retarding effect. Furthermore, the initial moment arm for these longer or slower shutter speeds relative to the axis of rotation of the retarding mass is made short to provide a greater path of engaged movement between contacting portions of the retarding lever and the retarding mass. This also permits a less sensitive adjustment for variation of the wider range of slower shutter speeds. The adjustment of the contacting surfaces to a longer initial moment arm relative to the retarding mass for shorter shutter speeds permits the effective retarding force applied to them to be greatly minimized thereby facilitating the provision of these shorter shutter speeds without making it extremely difficult to provide by means of the same retarding mass the higher retarding forces required for the slower shutter speeds.

Figure 2:
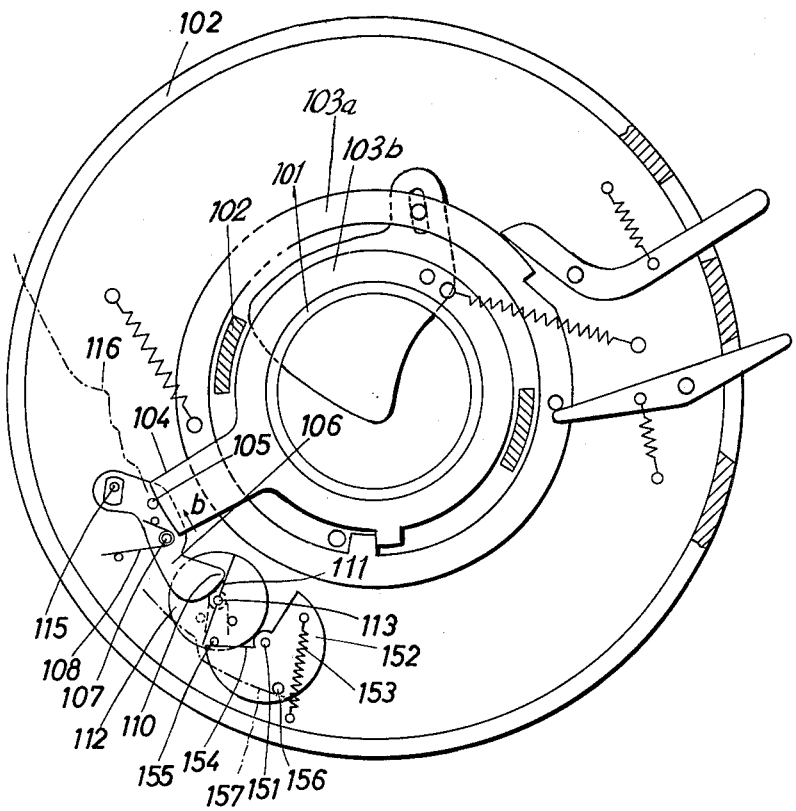
FIG. 2 is a schematic diagram of another embodiment of this invention incorporating a dual stage retarding mass.

In FIG. 2 is shown another embodiment of this invention which is arranged upon a shutter of the type described in commonly assigned copending application S.N. 62,021, filed October 11, 1960. In FIG. 2 the lens tube is designated by reference numeral 101, the shutter casing by 102 and the two sector rings which are concentrically rotatably mounted about the optical axis of the camera by 103a and 103b. These shutter sector operating rings 103a and 103b are reacted upon by the undesignated spring shown in the drawing which operate them to accomplish the release of the shutter. Sector ring 103b includes an arresting surface or projection 104 which constitutes a moving element of the shutter characterized in that the exposure time provided by the shutter is a function of its speed of movement. Projection 104 accordingly engages driven arm 105 of retarding lever 106 which is likewise constructed in the form of a double arm lever which is rotatably mounted around a stationary pivot pin 107. A return spring 108, which is for example a torsion spring, reacts between shutter casing 102 and lever 106 in a direction to urge lever 106 into engagement with a timing cam later described. The rounded tip 110 of the retarded end or arm of lever 106 engages a planar radial surface 111 of a retarding mass 112 generally similar to retarding mass 12 in FIG. 1. FIG. 2 also shows a second retarding mass or stage provided by another retarding mass 152, which is rotatably mounted about a stationary pivot pin 151.

A return spring 153, which is for example also a torsion spring, reacts against retarding disc 152 in a direction to maintain its contacting surface 154 in pressurable contact with a control or contacting pin 155 upon primary retarding mass 112. Additional retarding mass 152 is engaged with a control means provided by auxiliary timing cam 157 by means of a projection 156 which engages it. Projecting pin 156 may also be eccentrically mounted to facilitate its adjustment. Auxiliary timing cam 157 is formed to provide various exposure times which are not particularly specified.

FIG. 2 shows additional retarding mass 152 engaged with primary retarding mass 112 by contact of pin 155 extending from mass 112 with surface 154 of additional mass 152. The engaged retarding masses provide a maximum effective retarding force, acting through lever 106, upon shutter sector ring 103b and thereby upon the shutter. This is accomplished through projection 104 of sector ring 103b which moves in the direction of arrow "b" to engage pin 105 extending from retarding lever 106. This arrangement therefore provides a high degree of retarding effect for relatively slower shutter speeds. This retarding effect can be varied and lessened by shifting timing cams 116 and 157.

Those timing cams can be arranged to first only vary the adjustment of retarding lever 106 while retarding masses 112 and 152 remain engaged. This permits a variety of slower shutter speeds to be provided. The adjustment of retarding lever 106 can be accomplished by variation in the engagement of pin 115 with timing cam surface 116 by movement of cam 116 and rotation of the eccentric mounting for pin 115. As the timing cams are still further adjusted to shorter shutter speeds, the additional retarding mass 152 can be urged by timing cam 157 which reacts upon pin 156 to become totally disengaged from the primary retarding mass 122. This greatly reduces the effective retarding force, and permits shorter retarding effects and higher speeds to be provided by adjustment of retarding lever 106 in a similar manner to that described with reference to FIG. 1.

Figure 3:
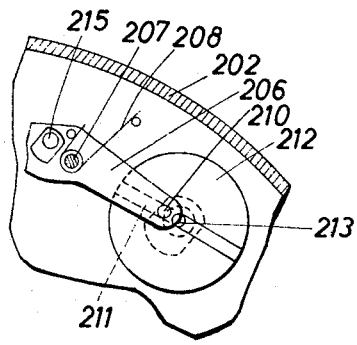
FIG. 3 is a fragmentary schematic diagram of another embodiment of this invention.

In FIG. 3 is shown another embodiment of this invention in which retarding lever 206 is more closely coupled to retarding mass 212. For this purpose a projecting pin 210 is mounted upon lever 206 and engaged within a slot 211 upon retarding mass 212, which is for example radially directed. This slot can be also advantageously shaped in a form of a curve such as an arc of a circle or a spiral as may the planar contact surfaces described in FIGS. 1 and 2. Such curves make it possible to form timing cams 16 and 116 in linearly arranged curves to provide the required geometric increments of shutter speeds. The eccentric mounting of various of the illustrated bearings provides the advantage of accurate, dependable and simple means for adjusting the retarding device. The additional retarding devices can also be formed as discs incorporating a series of protuberances about their circumferences, and the illustrated lever may cooperate with this broken surface. The lever and retarding mass may accordingly be constructed in the form of a pawl and ratchet drive.

What is claimed is:

1. A retarding device for a photographic shutter having operating means for opening and closing it and a moving element connected to it characterized in that the exposure time provided by said shutter is a function of the speed of movement of said moving element, said retarding device comprising a retarding lever including driven and retarded ends, pivot means rotatably mounting said retarding lever with its driven end interposed in the path of said moving element for engaging said moving element to retard it and said shutter, a retarding mass, bearing means rotatably mounting said retarding mass in the path of said retarded end of said retarding lever, said retarding lever and mass having contacting surfaces which engage each other at a moment arms relative to their axis of rotation which vary during their contacting movement to cause the retarding force transmitted through said lever to vary during the operation of said shutter, and control means engaged with said retarding lever for varying the amount of initial interposition of said driven end of said retarding lever into the path of said moving element and the initial moment arm of said contacting surfaces relative to the axis of rotation of said retarding mass at the beginning of said contacting movement to vary its retarding effect upon said shutter whereby slower shutter speeds are provided with greater amounts of said interposition and smaller initial moment arms.

2. A retarding device as set forth in claim 1 wherein said moment arms relative to said axes of rotation vary during operation of said shutter to decrease the retarding effect upon said shutter as it is being retarded.

3. A retarding device as set forth in claim 1 wherein the distance between said pivot and said bearing means is variable to allow adjustment of the initial moment arms of said contacting surfaces whereby the effective initial transmission of the force of said retarding mass to said shutter is decreased for faster shutter speeds relative to these used for slower shutter speeds.

4. A retarding device as set forth in claim 3 wherein said bearing is eccentrically mounted for varying said initial moment arms.

5. A retarding device as set forth in claim 3 wherein the initial moment arm relative to said retarding mass is decreased for slower shutter speeds to strengthen the retarding effect during said slower speeds and to provide a greater area of engaged contact between said retarding lever and said retarding to facilitate the provision of a wider range of slower shutter speeds.

6. A retarding device as set forth in claim 1 wherein said control means adjusting the interposition of said driven end of said retarding lever into the path of said moving element is constructed and arranged in the form of a linear function which varies said interposition and said moment arms of said contacting surfaces of retarding lever and said retarding mass which converts said linear function into increments of shutter speeds which vary in a relationship of a higher power.

7. A retarding device as set forth in claim 1 wherein said retarding mass comprises a rotatably mounted mass, and a surface is provided upon said mass which is contacted by said retarded end of said retarding lever.

8. A retarding device as set forth in claim 7 wherein said surface is formed in the shape of a curve.

9. A retarding device as set forth in claim 8 wherein said curve is an arc of a circle.

10. A retarding device as set forth in claim 7 wherein said surface is radially directed.

11. A retarding device as set forth in claim 1 wherein the axis of rotation of said pivot means for said retarding lever is fixed.

12. A retarding device as set forth in claim 1 wherein a slot is formed in said retarding mass, and a projection extends from said retarding lever into engagement with said slot for providing said contacting surfaces between them.

13. A retarding device as set forth in claim 1 wherein a timing cam provides said control means for adjusting the interposition of said retarding lever into the path of said moving element, a follower projection extends from said retarding lever into engagement with said timing cam, and said follower projection being eccentrically mounted to vary the angular engagement of said retarding lever with said timing cam.

14. A retarding device as set forth in claim 1 wherein an additional retarding mass is mounted adjacent said first-mentioned retarding mass, and adjustment means are engaged with said additional retarding mass for varying the amount and character of engagement of said retarding masses with each other.

15. A retarding device as set forth in claim 14 wherein said adjustment means is a timing cam, and a follower projection upon said additional retarding mass engages said timing cam.

16. A retarding device as set forth in claim 1 wherein said retarding mass comprises a disc including protuberances about its circumference, and said retarding end of said retarded lever engages said circumference including protuberances.

17. A retarding device as set forth in claim 16 wherein said disc and said retarded end of said retarding lever are formed as a ratchet and pawl.

18. A retarding device as set forth in claim 14 wherein said additional retarding mass and said first-mentioned retarding mass include mutually contacting surfaces which engage at moment arms which vary during their contacting movement to cause the additional retarding force imposed by said additional retarding mass upon first-mentioned retarding mass to vary during their engaged movement.

19. A retarding device as set forth in claim 18 wherein said mutually contacting surfaces of said retarding masses are comprised of a pin and slot connection.

20. A retarding device as set forth in claim 18 wherein said additional retarding mass comprises a rotatably mounted disc including an elongated surface which forms one of said mutually contacting surfaces, and the other of said mutually contacting surfaces comprises a projection upon said first-mentioned retarding mass which engages said elongated surface.

21. A retarding device as set forth in claim 20 wherein an auxiliary timing cam is mounted adjacent said additional retarding mass, and said projection for said first mentioned auxiliary timing cam is engaged with said auxiliary timing cam for controlling its interposition and movement out of the path of said first-mentioned retarding mass.

22. A retarding device as set forth in claim 1 wherein a spring reacts against said retarding lever in a direction to urge it into the path of said moving element of said shutter and into engagement with said control means.

23. A retarding device as set forth in claim 1 wherein a return spring reacts against said retarding mass in a direction to maintain it engaged with said retarding lever.

24. A retarding device as set forth in claim 1 wherein a return spring reacts against said retarding lever in a direction to urge it into the path of said moving element of said shutter and into engagement with said control means, and another return spring reacts against said retarding mass in a direction to maintain it engaged with said retarding lever.

25. A retarding device as set forth in claim 1 wherein said control means is a timing cam, a follower projection being mounted upon said retarding lever, and said follower projection being engaged with said timing cam for varying the angular orientation of said retarding lever whereby said initial interposition and moment arm are simultaneously varied.

26. A retarding device as set forth in claim 25 wherein said timing cam is constructed in the form of a linear function, and said simultaneous varying of initial interposition and moment arm provides increments of shutter speeds which vary as a function of a higher power.

References Cited in the file of this patent
UNITED STATES PATENTS
2,961,935    Rentschler _____ Nov. 29, 1960